No. 651,523. Patented June 12, 1900.
F. J. BLASCHKE.
COMBINED CULTIVATOR AND COTTON CHOPPER.
(Application filed Mar. 13, 1900.)
(No Model.) 3 Sheets—Sheet 1.
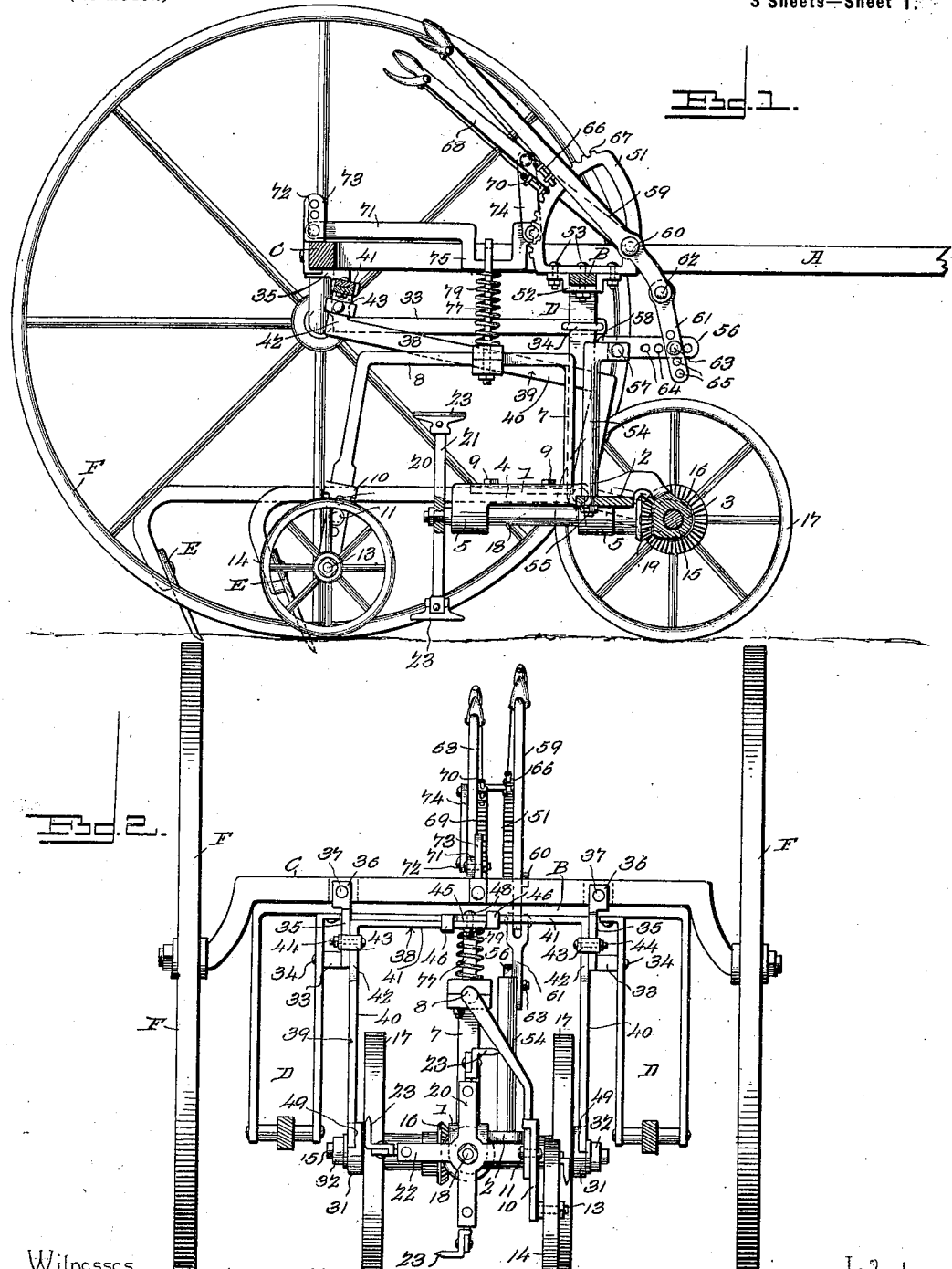
Witnesses
Inventor
F. J. Blaschke
By his Attorneys, No. 651,523.   Patented June 12, 1900.
F. J. BLASCHKE.
COMBINED CULTIVATOR AND COTTON CHOPPER.
(Application filed Mar. 13, 1900.)
(No Model.)   3 Sheets—Sheet 2.
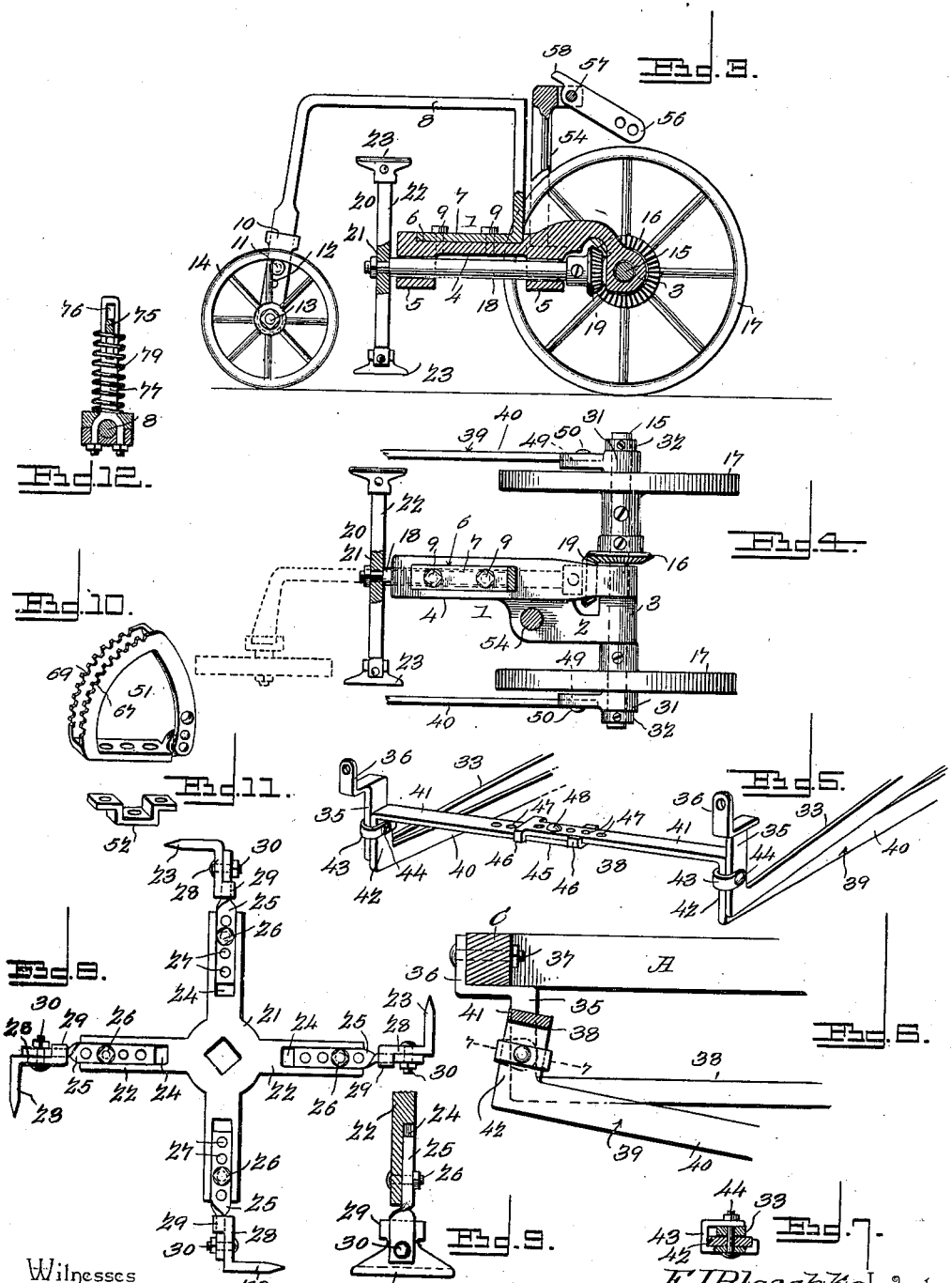

No. 651,523.  
F. J. BLASCHKE.  
COMBINED CULTIVATOR AND COTTON CHOPPER.  
(Application filed Mar. 13, 1900.)  
(No Model.)  
Patented June 12, 1900.  
3 Sheets—Sheet 3.
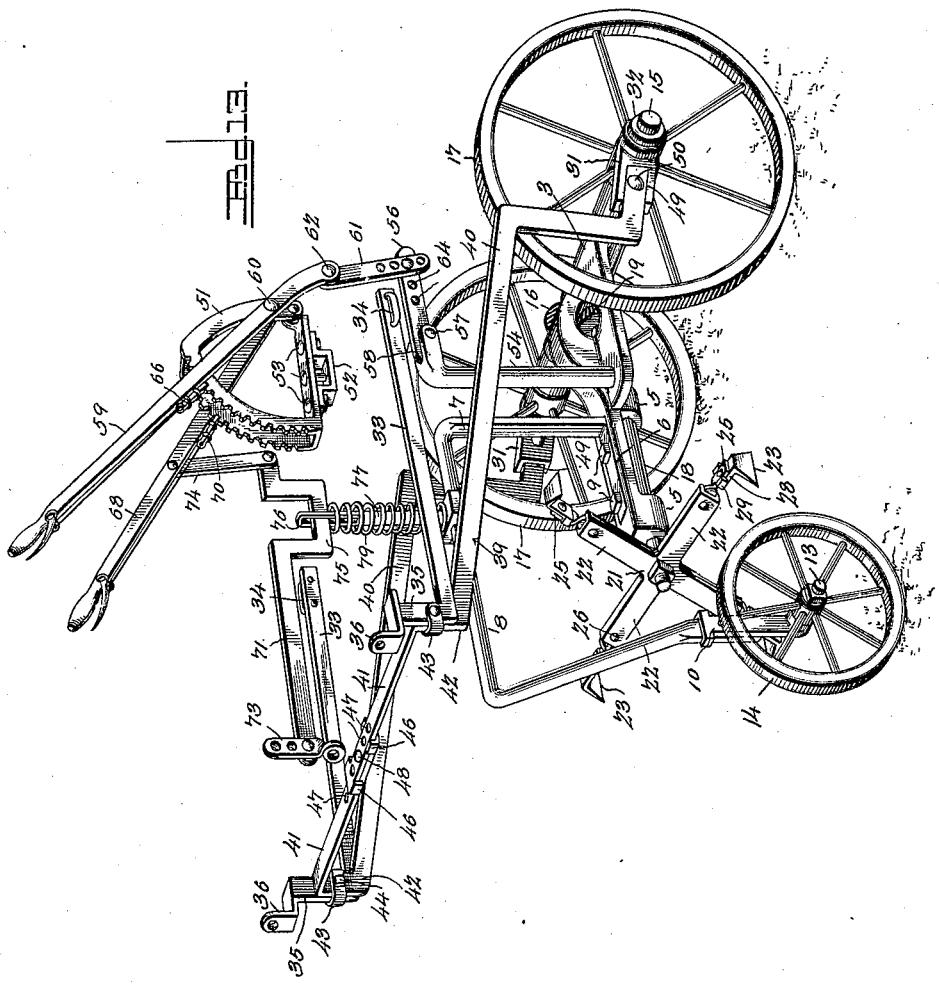

UNITED STATES PATENT OFFICE.

FRANK J. BLASCHKE, OF RICE'S CROSSING, TEXAS.

COMBINED CULTIVATOR AND COTTON-CHOPPER.

SPECIFICATION forming part of Letters Patent No. 651,523, dated June 12, 1900.

Application filed March 13, 1900. Serial No. 8,484. (No model.)

*To all whom it may concern:*

Be it known that I, FRANK J. BLASCHKE, a citizen of the United States, residing at Rice's Crossing, in the county of Williamson and State of Texas, have invented a new and useful Combined Cultivator and Cotton-Chopper, of which the following is a specification.

My invention is a combined sulky-cultivator and cotton-chopper; and it consists in the combination, with a supporting and draft sulky-frame carrying cultivating-plows, of an independent truck provided with revoluble chopping-hoes and operating mechanism therefor, the object of my invention being to provide an improved cotton-chopping mechanism which is adapted to be combined with and operated in connection with a sulky-cultivator, whereby a growing crop of cotton may be plowed and chopped or hoed simultaneously.

My invention further consists in the peculiar construction and combination of devices hereinafter fully set forth, and pointed out in the claims.

In the accompanying drawings, Figure 1 is side elevation, partly in section, of my improved cotton-chopper, showing the same combined with a sulky-cultivator. Fig. 2 is a rear elevation of the same. Fig. 3 is partly a side elevation and partly a vertical central sectional view of my improved cotton-chopper truck-frame and operating mechanism, showing the same detached from the frame of the sulky-cultivator. Fig. 4 is a top plan view of the same, partly in section, on the line *x x* of Fig. 3. Fig. 5 is a detail perspective view of portions of the draft-bars and of a portion of the rocking frame. Fig. 6 is a detail sectional view of the same, showing the draft-bar attached to the rear side of the sulky-cultivator frame. Fig. 7 is a detail sectional view taken on the line 7 7 of Fig. 6, showing the clip and pivotal bolt for connecting the arms of the rocking frame to the draft-bars. Fig. 8 is a detail rear elevation of the revoluble cotton-chopper, showing the hoes in operative position attached thereto. Fig. 9 is a detail view of the same. Fig. 10 is a detail perspective view of the segment-rack forming a pivotal and adjusting support for the elevating-lever of the cotton-chopper. Fig. 11 is a detail perspective view of the clip used in connection with said segment-rack for attaching the latter to the front cross-bar of the sulky-frame. Fig. 12 is a detail sectional view of the depressing-link and tension-spring for connecting the trail-bar of the cotton-chopper to the depressing-lever. Fig. 13 is a detail perspective view of my improved cotton-chopper truck-frame and operating mechanism and the connections adapted for attaching the same to the frame of a sulky-cultivator, the latter being omitted.

My improved cotton-chopper is designed, primarily, for use in connection with a sulky-frame of usual construction, such as indicated at A, and having the front cross-bar B, the rear cross-bar C, constituting the axle, and the vertical standard-frame D, serving for the supports and the attachment of suitable cultivating-plows, as at E, F being the supporting-wheels of the sulky; but such sulky-frame *per se* constitutes no part of my present invention and may be of any usual form.

In the embodiment of my improved cotton-chopper the frame 1 constitutes, preferably, a single casting of the form shown in Figs. 3 and 4, having the offset right-angled front arm 2 bored transversely to form a bearing 3, the longitudinal rear portion or arm 4 of said frame or casting being provided on its under side with bearings 5, which are at right angles to the bearing 3. On the upper side of the frame or casting 1 is formed a longitudinal recess 6, which forms a seat for the lower rearwardly-extending portions 7 of the substantially inverted-U-shaped trail-bar 8. The said portion 7 is bolted to the frame 1, as at 9. The rear depending arm of the trail-bar 8 is bent laterally to one side, as indicated in Figs. 2 and 4, and is provided with a vertically-adjustable standard-plate 10, which is bolted thereto, as at 11, a series of adjusting-openings 12 being provided for the said bolt. The said standard-plate is provided on one side with a projecting spindle 13, on which is mounted a trail-wheel 14. An axle-shaft 15 is journaled in the transverse bearing 3, has a beveled gear-wheel 16, keyed or otherwise secured thereto, and is further provided with a pair of supporting traction-wheels 17. The said frame or casting 1, together with the trail-bars, trail-wheel, axle-shaft, and wheels 17, constitutes a truck which is independent of the sulky-cultivator and is adapted to operate under the same, as hereinafter described. A shaft 18 is journaled in the bearings 5, is provided at its front end with a beveled gear-wheel 19, which engages the bevel gear-wheel on the axle-shaft, and to the rear end of said shaft is attached the revoluble cotton-chopper 20, the same comprising, essentially, a spider-frame 21, provided with radial arms 22, adapted for the attachment of chopping-hoes 23.

The arms 22 of the spider 21 are provided on their front sides with open slotted recesses 24, forming seats for the reception of stocks 25, secured therein by bolts 26. The said stocks are provided with adjusting bolt-holes 27, whereby they may be adjusted radially with relation to the arms of the spider. To the outer portion of the stocks 25 are secured the chopping-hoes 23, which are provided with shanks 28 at an angle thereto, said shanks bearing on the front sides laterally of the stocks 25 and having keepers 29 for the reception of said stocks, said shanks being further secured on said stocks by means of bolts 30. It will be understood that the chopping-hoes are thus provided with stocks from which they are separable, and that said stocks are adjustable radially, so that the chopping-hoes may be set to operate at any required depth in the soil, and, furthermore, that the chopping-hoes when they become worn or broken may be discarded and new ones substituted at but a slight expense.

Bearing-plates 31 are secured on the shaft 15 on the outer sides of wheels 17 by collars 32, as shown in Fig. 4, or said bearing-plates may be secured against lateral motion on the said shaft in any other suitable manner.

I will now describe means which I have devised for securing the cotton-chopper mechanism to the sulky-cultivator and for providing for its ready detachment therefrom.

Draft-bars 33 are bolted or otherwise suitably secured at their front ends to the inner sides of the vertical standard-frames D of the cultivator, as at 34, and the rear portions of said draft-bars are upturned at right angles, as at 35, and formed with right-angled saddles 36, which bear against the rear and under side of the axle C, forming the rear cross-bar of the sulky-frame, and are secured thereto by bolts, as at 37. A rocking frame 38, comprising the members 39, is employed for connecting the truck of the cotton-chopper to the draft-bars 33. Each member 39 of the rocking frame comprises the longitudinal front portion or arm 40, the transverse arm 41, and the intermediate right-angled portion 42, said right-angled portions 42 being placed against the inner sides of the upturned arms 35 of the draft-bars 33 and secured thereto by clip-frames 43 and pivotal bolts 44, hence securing the said members of the rocking frame to the rear portions of the draft-bars and adapting said rocking frame to rock or oscillate vertically. The rear arms 41 of the members of the rocking frame overlap at their proximate ends, as at 45. Said overlapping portions of said members have guides 46 formed therewith, which keep the arms 41 in alinement with each other and are further provided with a series of adjusting-openings 47 for a securing-bolt 48, this construction of the members of the rocking frame adapting the latter to be widened or narrowed as may be required in order to attach the same to sulky-frames which vary in width, the said rocking frames and the draft-bars, hereinbefore described, adapting my improved cotton-chopping mechanism to be attached to and operate in connection with any of the well-known forms of sulky-cultivators. The front ends of the arms of the rocking frame are received in seats 49, with which the bearing-plates 31 are provided, and are secured to said bearing-plates by bolts 50. Said rocking frame and draft-bars connect the chopping mechanism to the sulky-frame and serve as the means for drawing the cotton-chopping mechanism forward, together with the sulky-frame, or, in other words, for communicating the draft of the sulky-frame to the frame of the cotton-chopper and also adapt the latter to be raised and lowered under the sulky-frame.

I will now describe levers and connections which I have devised for raising and lowering the cotton-chopper and for exerting vertical downward pressure thereon for keeping the same at work when used in light soil and for permitting the same to yield and move upwardly when an obstruction—such as a root, stump, or stone—is encountered by one of the wheels of the cotton-chopper, and thus avoid injury to the latter.

A segment-rack frame 51 is bolted centrally on the front cross-bar B of the sulky-cultivator frame, and a clip-frame 52 is placed on the under side of said cross-bar and bolted thereto and also to the segment-rack frame 51, as at 53. A vertical arm 54 has its lower end secured in the frame or casting 1, as at 55, or in any other suitable manner, and to the upper end of said vertical arm, which is outturned horizontally, is pivoted the rear end of a link 56 by a bolt 57, and said link has at its rear end, on its upper side, a projecting shoulder 58, which while permitting said link to swing downwardly at its front end with relation to the arm 54 engages said arm when said link is at right angles thereto, for a purpose hereinafter described. A lever 59 is pivoted to the segment-rack frame 51, as at 60, and is provided at its lower end with a link 61, pivoted thereto by a bolt, as at 62, and said link is pivotally connected to the rocking link 56 by a bolt 63, which may be fitted in any appropriate openings of the series of adjusting-openings 64 65, with which the rocking link and link 61 are respectively provided. The said lever 59 should preferably be a hand-lever of the form usually employed in agricultural machines and provided with a spring-pressed detent 66, of the usual form, for engaging one of the racks 67 of the rack-frame 51, and thereby locking said lever at any required adjustment.

It will be understood by reference to Figs. 1 and 3 and from the foregoing description that by means of the rocking link and link 61, which connect the cotton-chopper to the hand-lever 59, said cotton-chopper is adapted to play or move vertically when the lever 59 is locked, said links serving as flexible connections between the arm 54 of the cotton-chopper and said hand-lever 59, and hence the said cotton-chopper is adapted to yield or spring upward when it encounters an obstruction, such as a root, stone, or stump. When the lever 59 is depressed so as to raise the link 61, the shoulder 58 of the rocking link by engaging with the arm 54 prevents said rocking link from turning on its pivotal bolt 57 after it has reached a horizontal position, and hence the cotton-chopper may be raised by the said lever 59 out of contact with the earth, so that the sulky may be driven from one field to another or turned at the end of a row and the cotton-chopper thrown out of operation. A hand-lever 68 is also pivoted on the bolt 60, that serves as the pivot for the lever 59, and said hand-lever 68 operates between the segment-racks 67 69 of frame 51 and is provided with a spring-pressed detent 70, of usual construction, for engaging said rack 69 and securing said lever at any desired adjustment. A link-lever 71 has its rear end pivoted by a bolt 72 to a bracket-arm 73, which is bolted centrally to the axle or rear cross-bar of the sulky-frame, as shown, and the front end of said link-lever 71 is connected to the hand-lever 68 by a link 74. A depending offset 75 is formed in the link-lever and is disposed in a vertical slot 76, formed in the upper portion of a depressing-link 77, said link being secured at its lower end to the trail-bar 8 of the cotton-chopper, as shown in detail in Fig. 12, or in any other suitable manner. A tension-spring 79 on said depressing-link bears between the link-lever and the trail-bar 8, and when said link-lever is lowered to the operative position shown in Fig. 1 said tension-spring serves to exert downward pressure on the cotton-chopper and keep the same, with its traction-wheels, in operative contact with the ground, the weight of the cotton-chopping mechanism, which is of simple construction, not being sufficient perhaps under all conditions to cause the same to operate with maximum efficiency. When the lever 59 is depressed so as to raise the front portion of the cotton-chopper, the lever 68 should be raised so as to cause the link-lever 71 and link 79 to elevate the trail-bar, which forms a part of the cotton-chopping mechanism, and thereby raise the trail-wheel also from the ground.

The operation of the cotton-chopper will be readily understood. The same is drawn, together with the sulky-frame, so that its wheels 17 are astride of a row of cotton-plants, the trail-wheel 14 being substantially in line with one of the wheels 17, and the plows E, with which the sulky-frame is provided, operating on opposite sides of the row. The shaft 18 of the revoluble cotton-chopper is disposed over the row of plants or cotton-ridge, and rotary motion being imparted thereto by means of the gears which connect it with the shaft 15 the chopping-hoes are rotated transversely over the cotton-ridge and serve effectually to perform the operations of chopping or hoeing the cotton, as the case may be, simultaneously with the operation of the sulky-plow in cultivating between the rows.

Having thus described my invention, I claim—

1. In combination with a sulky-frame, a truck having revoluble hoes and operating mechanism therefor, a rocking frame connecting said sulky-frame with said truck, levers and connections between the same and the truck, to raise and lower the latter, substantially as described.

2. In combination with a sulky-frame, a truck having revoluble hoes and operating mechanism therefor, connections between said truck and said sulky-frame, whereby draft is imparted to the former, levers and connections to raise and lower said truck under the draft-frame and a tension-spring bearing downward on said truck, for the purpose set forth, substantially as described.

3. In combination with a truck having revoluble hoes and operating mechanism therefor, draft-bars adapted to be detachably secured to a sulky-frame, a rocking frame pivotally connected to said draft-bars and to said truck, a lever having a support adapted to be detachably secured to the sulky-frame, and connections between the lever and the truck whereby the latter may be raised and lowered, substantially as described.

4. In a cotton-chopper, the combination of a frame having longitudinal and transverse bearings, an axle-shaft in the transverse bearing and having supporting, traction-wheels, a shaft in the longitudinal bearing, gears connecting said shafts, and a revoluble chopper secured to the longitudinal shaft, substantially as described.

5. In a cotton-chopper, the frame having supporting traction-wheels, the revoluble chopper and means to rotate the latter, and the trail-bar extending rearward from said frame and having the trail-wheel, in combination with means for connecting said frame to a sulky-plow frame, and means for raising and lowering said frame, substantially as described.

6. In combination with a cotton-chopper mechanism on an independent truck, draft-bars secured to a sulky-frame, a rocking frame connecting said truck to said draft-bars, a link-lever, means including a depressing-spring connecting said truck to said link-lever, and levers for raising and lowering said truck, one of said levers being connected to said link-lever, substantially as described.

7. In combination with a sulky or draft frame, a cotton-chopper comprising an independent truck having revoluble cotton-chopping hoes and operating means therefor, connections between said truck and said sulky or draft frame, a spring bearing downward on the truck, a lever to raise and lower the truck, and flexible connections between said lever and said truck whereby the latter is rendered capable of independent vertical movement, for the purpose set forth, substantially as described.

8. In combination with a cotton-chopper comprising a truck and cotton - chopping mechanism, draft-bars adapted to be detachably secured to a sulky-frame, as of a sulky-cultivator plow, a rocking frame pivotally connected to said draft-bars and also connected to the truck of the cotton-chopper, substantially as described.

9. In combination with a cotton-chopper comprising a truck and cotton - chopping mechanism, draft-bars adapted to be detachably secured to a sulky-frame, as of a sulky-cultivator plow, and a rocking frame connected to said truck and to said draft-bars, said rocking frame being expansible laterally, whereby it may be widened or narrowed for the purpose set forth, substantially as described.

10. In combination with a cotton-chopper, comprising a truck and cotton - chopping mechanism, means for connecting said truck to a sulky-frame, as of a sulky-plow, the segment-rack frame 51 adapted to be detachably secured to the sulky-frame, levers connected to said frame 51 and removable from the sulky-frame therewith, and connections, substantially as described, between said levers and the truck of the cotton-chopper, for the purpose set forth, substantially as described.

In testimony that I claim the foregoing as my own I have hereto affixed my signature in the presence of two witnesses.

FRANK J. BLASCHKE.

Witnesses:
C. STRAUB.
H. SAKEWITZ.